US012719773B2

(12) United States Patent
Huang et al.

(10) Patent No.: US 12,719,773 B2
(45) Date of Patent: Aug. 25, 2026

(54) METHOD AND SYSTEM FOR MONITORING EVENT HANDLING OF END DEVICES

(71) Applicant: Verizon Patent and Licensing Inc., Basking Ridge, NJ (US)

(72) Inventors: Ye Huang, San Ramon, CA (US); Miguel A. Carames, Long Valley, NJ (US); Shanthala Kuravangi-Thammaiah, Keller, TX (US); Robert Avanes, Roanoke, TX (US); Florencio Martinez, Monroe Township, NJ (US); Vanesa Kovac, Ridgewood, NJ (US); Diane Marie Waslo, Elgin, IL (US); Timothy J. Korver, Whippany, NJ (US); Venkata Siva Reddy Bathinna, Irving, TX (US); Riyaj Uddin Ahmed, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 617 days.

(21) Appl. No.: 17/587,547

(22) Filed: Jan. 28, 2022

(65) Prior Publication Data

US 2023/0246932 A1 Aug. 3, 2023

(51) Int. Cl.
*H04W 8/04* (2009.01)
*H04L 43/08* (2022.01)

(52) U.S. Cl.
CPC ............... *H04L 43/08* (2013.01); *H04W 8/04* (2013.01)

(58) Field of Classification Search
CPC ................................ H04L 43/08; H04W 8/04
USPC .......................................................... 709/224
See application file for complete search history.

(56) References Cited

U.S. PATENT DOCUMENTS

| | | | | |
|---|---|---|---|---|
| 9,942,807 | B2 * | 4/2018 | Zhu | H04W 76/19 |
| 2020/0077356 | A1 * | 3/2020 | Youn | H04W 68/02 |
| 2021/0112462 | A1 * | 4/2021 | Zhu | H04W 24/04 |
| 2021/0352552 | A1 * | 11/2021 | Keller | H04W 60/06 |
| 2022/0182962 | A1 * | 6/2022 | Sridharan | H04W 8/24 |
| 2022/0248361 | A1 * | 8/2022 | Long | H04W 60/005 |
| 2022/0338000 | A1 * | 10/2022 | Lee | H04W 12/06 |
| 2023/0075951 | A1 * | 3/2023 | Long | H04L 69/40 |
| 2023/0164727 | A1 * | 5/2023 | Wei | H04W 60/04 455/435.1 |
| 2023/0209326 | A1 * | 6/2023 | Merino Vazquez | H04W 8/10 455/435.2 |

* cited by examiner

*Primary Examiner* — Ario Etienne
*Assistant Examiner* — Kidest Mendaye

(57) ABSTRACT

A method, a device, and a non-transitory storage medium are described in which a monitoring event handling service is provided. The service may include a non-stand-alone core device subscribing to a registration status for an end device with a stand-alone core device. The service may also include the non-stand-alone core device subscribing to a monitoring event service with the stand-alone core device on behalf of another non-stand-alone core network device. The stand-alone core device may monitor an event when the end device is stand-alone registered and may notify the non-stand-alone core device when the event occurs. The service may include the non-stand-alone core device notifying the other non-stand-alone core device when the event occurs.

20 Claims, 5 Drawing Sheets

METHOD AND SYSTEM FOR MONITORING EVENT HANDLING OF END DEVICES

BACKGROUND

Development and design of networks present certain challenges from a network-side perspective and an end device perspective. For example, Next Generation (NG) wireless networks, such as Fifth Generation New Radio (5G NR) networks are being deployed and under development. Interworking and coordination between the different generation networks can be critical to ensure service consistency and customer satisfaction.

DETAILED DESCRIPTION

The following detailed description refers to the accompanying drawings. The same reference numbers in different drawings may identify the same or similar elements. Also, the following detailed description does not limit the invention.

A core network may support a monitoring event (also known as MONTE) service associated with end devices. For example, a service capability exposure function (SCEF) may be configured with an event to monitor, detect the occurrence of the event, and report the occurrence of the event to authorized devices. For example, an application server (AS) may subscribe to the monitoring service and receive a notification when the event is detected. The event may relate to the location of the end device, end device reachability, loss of connectivity, communication failure, packet data network (PDN) connectivity status, among others. In view of the ongoing transition from Fourth Generation (4G) networks to Fifth Generation (5G) networks, as well as the interworking between these networks, the monitoring service may not be supported by the SCEF and/or a home subscriber server (HSS) for all end devices. For example, the SCEF does not support the monitoring service for end devices operation in 5G stand-alone (SA) mode.

According to exemplary embodiments, a monitoring event handling service is described. According to an exemplary embodiment, the monitoring event handling service may include monitoring services pertaining to 5G SA and 5G non-stand-alone (NSA) end devices. According to an exemplary embodiment, the monitoring event handling service may include configuring a network device of a 5G core network to notify a network device of a 4G core network when an event is detected. According to an exemplary embodiment, the monitoring event handling service may include an interworking between a unified data management (UDM) and/or a unified data repository (UDR) (also referred to as UDM/UDR), an HSS, and an SCEF, as described herein. According to an exemplary embodiment, the monitoring event handling service may include event detection services performed by a network device of a 5G core network, as described herein.

In view of the foregoing, the monitoring event handling service be implemented in various core network environments (e.g., 4G, 5G, and future generation core networks (e.g., 5.5G, sixth generation (6G), and so forth) and may pertain to various types of end device connections thereto (e.g., SA, NSA, various 5G options (e.g., 3, 3a, 3x, 4, 5, 7, or the like), future generation options, etc.). Additionally, the monitoring event handling service may provide the monitoring, detecting, and reporting services for configured events to authorized devices, as well as to ensure interoperability between core networks (e.g., 4G and 5G, etc.).

Figure 1:
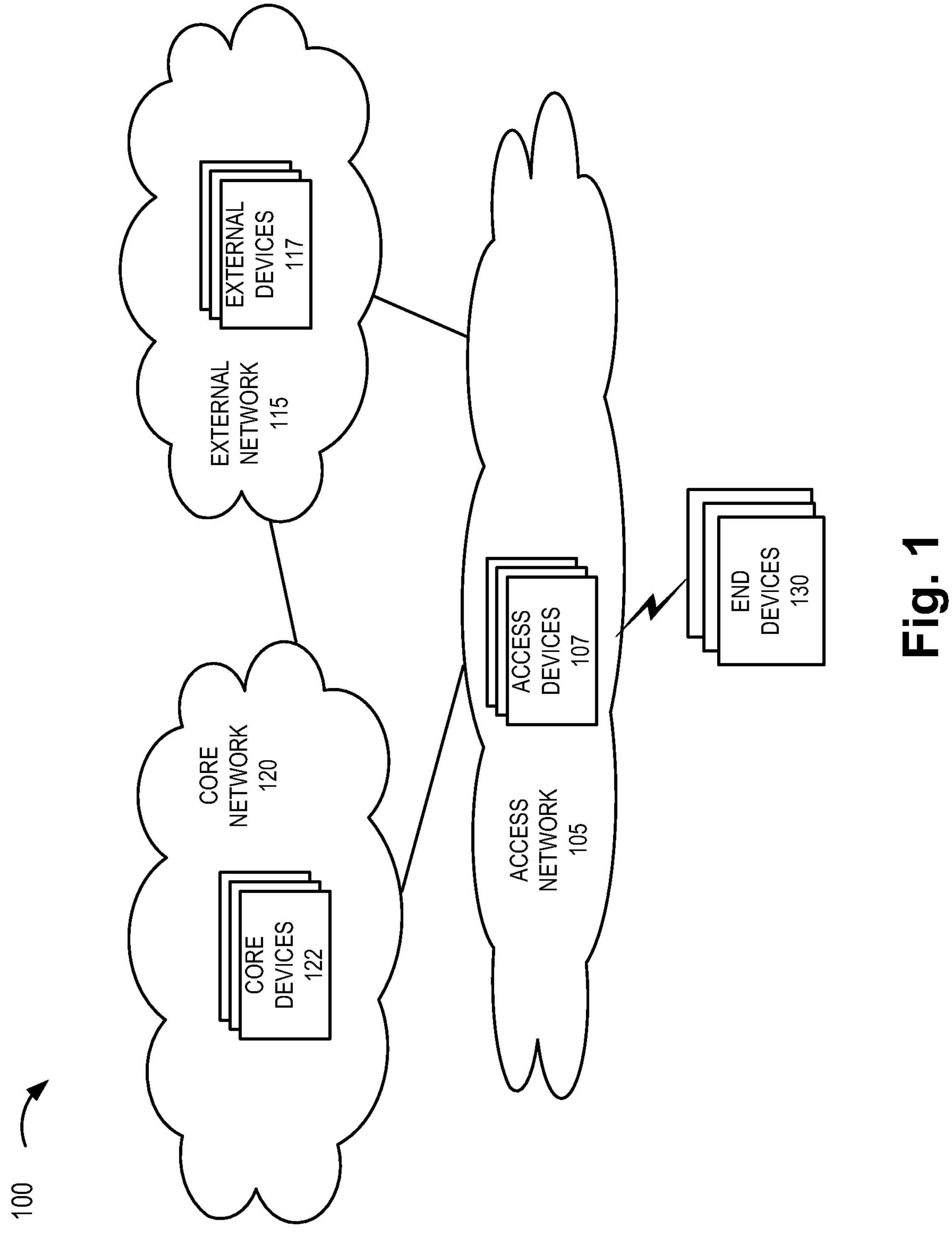
FIG. 1 is a diagram illustrating an exemplary environment in which an exemplary embodiment of a monitoring event handling service may be implemented.

FIG. 1 is a diagram illustrating an exemplary environment 100 in which an exemplary embodiment of monitoring event handling service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), virtual, logical, network slice, etc.). The number, the type, and the arrangement of network devices, and the number of end devices 130 are exemplary.

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the monitoring event handling service may use at least one of these planes of communication. Additionally, an interface of a network device may be modified (e.g., relative to an interface defined by a standards body, such as Third Generation Partnership Project (3GPP), 3GPP2, International Telecommunication Union (ITU), European Telecommunications Standards Institute (ETSI), Global System Mobile Association (GSMA), and the like) or a new interface of the network device may be provided in order to support the communication (e.g., transmission and reception of messages, an information element (IE), an attribute value pair (AVP), an object, a parameter, or another form of a data instance) between network devices and the monitoring event handling service logic of the network device. According to various exemplary implementations, the interface of the network device may be a service-based interface, a reference point-based interface, an Open Radio Access Network (O-RAN) interface, a Fifth Generation (5G) interface, another generation of interface (e.g., 5.5G, 6G, Seventh Generation (7G), etc.), or some other type of network interface.

Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), and/or another type of access network. Access network 105 may include a legacy RAN (e.g., a Third Generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120.

Access network 105 may include different and multiple functional splitting, such as options 1, 2, 3, 4, 5, 6, 7, or 8 that relate to combinations of access network 105 and a core network including, for example, an evolved packet core (EPC) network and/or an 5G core network, or the splitting of the various layers (e.g., physical layer, medium access control (MAC) layer, radio link control (RLC) layer, packet data convergence protocol (PDCP) layer, and/or other layers), plane splitting (e.g., user plane, control plane, etc.), a centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher, carrier aggregation (CA), edge and core network slicing, coordinated multipoint (CoMP), various duplex schemes, and/or another type of connectivity service (e.g., NSA new radio (NR), stand-alone (SA) NR, and the like).

Depending on the implementation, access network 105 may include one or multiple types of network devices, such as access devices 107. For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a centralized unit (CU), a CU control plane (CU CP), a CU user plane (CU UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access.

External network 115 may include one or multiple networks of one or multiple types and technologies that provides an application service. For example, external network 115 may be implemented using one or multiple technologies including, for example, network function virtualization (NFV), SDN, cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a MEC network, a fog network, the Internet, a packet data network (PDN), a service provider network, the World Wide Web (WWW), an Internet Protocol Multimedia Subsystem (IMS) network, a Rich Communication Service (RCS) network, an SD network, a virtual network, a packet-switched network, a data center, or other type of network that may provide access to and may host an end device application service.

Depending on the implementation, external network 115 may include various network devices such as external devices 117. For example, external devices 117 may include virtual network devices (e.g., virtualized network functions (VNFs), servers, host devices, containers, hypervisors, virtual machines (VMs), network function virtualization infrastructure (NFVI), and/or other types of virtualization elements, layers, hardware resources, operating systems, engines, etc.) that may be associated with application services for use by end devices 130. By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). External network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

Core network 120 may include one or multiple networks of one or multiple network types and technologies. Core network 120 may include a complementary network of access network 105. For example, core network 120 may be implemented to include a 5G core network, an EPC of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a UDM device, a unified data repository (UDR), an authentication server function (AUSF), a network slice selection function (NSSF), a network repository function (NRF), a policy control function (PCF), a binding support function (BSF), a network data analytics function (NWDAF), a network exposure function (NEF), an SCEF, a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

According to an exemplary embodiment, some of core devices 122 may include logic that supports or provides the monitoring event handling service, as described herein. For example, an AMF and/or an SMF may include logic of the monitoring event handling service. According to another example, a UDM, a UDR, an HSS, or another repository that may store subscription information, may include logic of the monitoring event handling service. According to yet another example, an SCEF may include logic that supports or provides the monitoring event handling service, as described herein. According to other examples, other types of core devices 122 may include logic of the monitoring event handling service, as described herein.

End devices 130 include a device that may have computational and/or communication capabilities (e.g., wireless, wired, optical, etc.). End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of UE). End device 130 may be configured to execute various types of software (e.g., applications, programs, etc.). The number and the types of software may vary among end devices 130. End devices 130 may include "edge-aware" and/or "edge-unaware" application service clients. For purposes of description, end device 130 is not considered a network device.

End device 130 may support one or multiple RATs (e.g., 4G, 5G, and/or future generation RAT) and various portions of the radio spectrum (e.g., multiple RF bands, multiple carrier frequencies, licensed, unlicensed, mm wave, above mm wave, cm wave, etc.), various levels and genres of network slicing, DC service, CA service, and/or other types of connectivity services. Additionally, end device 130 may include one or multiple communication interfaces that provide one or multiple (e.g., simultaneous, interleaved, etc.) connections via the same or different RATs, frequency bands, carrier frequencies, network slices, and/or via another communication medium (e.g., wired, etc.). The multimode capabilities of end device 130 may vary among end devices 130.

According to an exemplary embodiment, end device 130 includes logic that provides the monitoring event handling service, as described herein. For example, end device 130 may include logic that executes a cause or non-access stratum (NAS) value pertaining to a remedial procedure associated with the monitoring event handling service, as described herein.

Figure 2A:
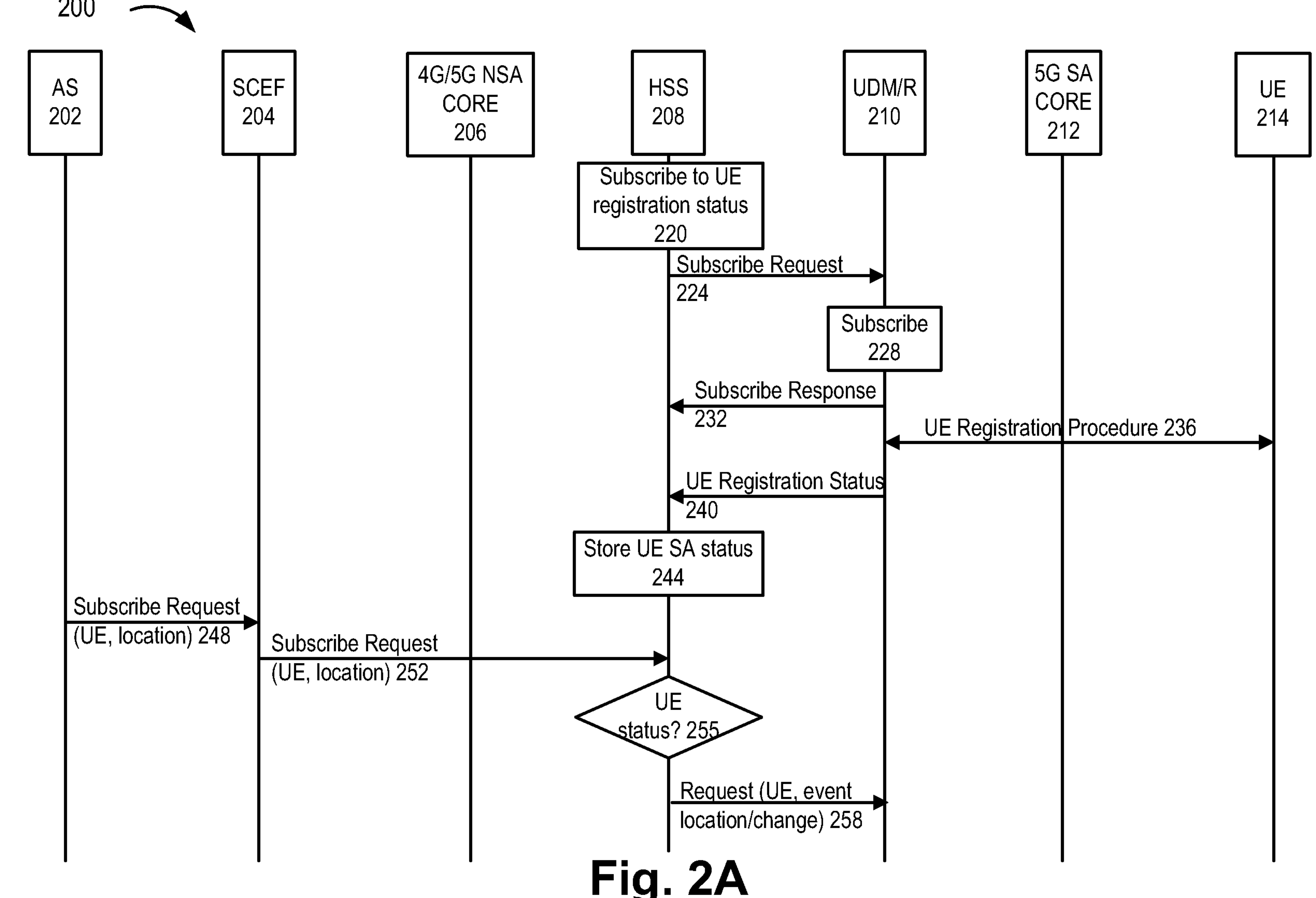
FIGS. 2A and 2B are diagrams illustrating an exemplary process of an exemplary embodiment of the monitoring event handling service.
Figure 2B:
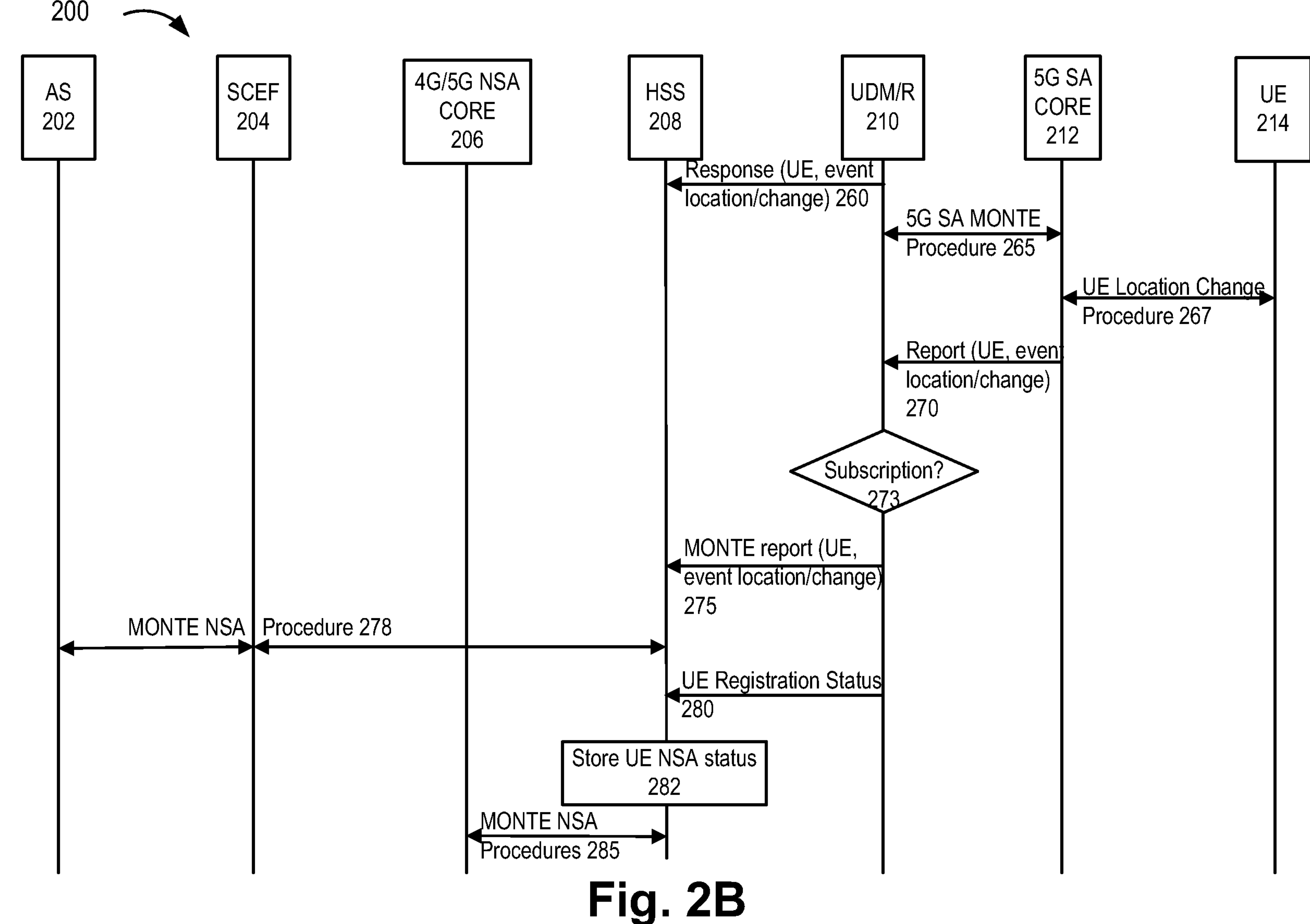

FIGS. 2A and 2B are diagrams illustrating an exemplary process 200 of an exemplary embodiment of the monitoring event handling service. Process 200 may be performed in an exemplary environment that includes access device 107, external device 117, core device 122, and end device 130. For example, the environment may include external device 117 (e.g., an application server (AS) 202), core devices 122 (e.g., an SCEF 204, 4G/5G NSA core 206, an HSS 208, a UDM and UDR (UDM/R) 210, a 5G SA core 212) and end device 130 (e.g., UE 214). Although not illustrated, environment 100 may include access device 107.

SCEF 204, HSS 208, and UDM/R 210 may operate and provide network functions or services specified by a standard (e.g., 3GPP, 3GPP2, etc.) and/or of a proprietary nature. For example, SCEF 204 may securely expose services and capabilities provided by a network to external, trusted, and untrusted application services/functions. HSS 208 and UDM/R 210 may store subscription data pertaining to end devices 130. Additionally, SCEF 204, HSS 208, and UDM/R 210 may include logic that performs operations and/or services of the monitoring event handling service, as described herein, which are beyond that of the standard and/or proprietary nature. 4G/5G NSA core 206 may include 4G and 5G core devices 122 that may support an NSA connection with UE 214 via access devices 107. 4G/5G NSA core 206 may support one or multiple NSA options (e.g., 1, 2, 3, 3a, 3x, 4, 5, 7, and/or other types of NSA architecture options), for example, and may include an EPC core with 4G/5G NSA. Also, 5G SA core 212 may include 5G core devices 122 that may support an SA connection with UE 214 via access device 107. 5G SA core 212 may support one or multiple SA options (e.g., 2, 5, and/or other types of SA architecture options). According to an exemplary embodiment, 5G SA core 212 may not include a NEF+SCEF device and/or a NEF device.

According to other exemplary embodiments, the exemplary environment may include a different type of core device 122 and/or end device 130 than that described in relation to FIGS. 2A and 2B. For example, AS 202 may be implemented as a service capability server (SCS) or include the SCS, for example. According to an exemplary embodiment, monitoring event handling service logic may perform a step of process 200. Also, the type of messages and the content of the messages illustrated and described in relation to FIGS. 2A and 2B are exemplary. According to other exemplary embodiments, additional and/or different messages may be transmitted and/or received to implement process 200 and the monitoring event handling service, as described herein. Some messages may have been omitted for the sake of brevity.

Referring to FIG. 2A, according to an exemplary scenario, HSS 208 may determine to subscribe to a registration status 220 for UE 214 with UDM/R 210. The registration status may pertain to when UE 214 is in an SA registered status. According to various exemplary embodiments, HSS 208 may make this determination based on a triggering event or according to a proactive procedure. For example, the triggering event may relate to an NSA registration procedure with UE 214, receipt of a subscription event from AS 202 via SCEF 204 regarding UE 214, or an indication of an SA registration with 5G SA core 212 (e.g., based on a shared repository with UDM/R 210). Additionally, or alternatively, the proactive procedure may relate to an onboarding procedure associated with the monitoring event handling service and UE 214, or another type of configured event/procedure.

Based on this determination, HSS 208 may generate and transmit a subscribe request 224 to UDM/R 210. Subscribe request 224 may request to subscribe to an SA registration status of UE 214. Subscription request 224 may include an identifier of UE 214, such as an International Mobile Subscriber Identity (IMSI), a Subscription Permanent Identifier (SUPI), a Subscription Concealed Identifier (SUCI), a Permanent Equipment Identify (PEI), a temporary and/or globally unique ID, or the like, for example. UDM/R 210 may receive subscribe request 224, and in response, set the UE registration status subscription 228. For example, UDM/R 210 may generate subscription information pertaining to HSS 208 and the UE registration status for UE 214. UDM/R 210 may generate and transmit a subscribe response 232 to HSS 208. Subscribe response 232 may include data indicating that the requested subscription has been completed or accepted.

According to this exemplary scenario, assume that UE 214 performs a registration procedure 236 for SA connectivity via 5G SA core 212 and UDM/R 210. Based on the SA registration status of UE 214 and the UE registration status subscription of HSS 208, UDM/R 210 may generate and transmit a UE registration status 240 message to HSS 208. UE registration status 240 message may include data indicating that UE 204 is SA registered. UE registration status 240 message may include the identifier UE 214 and other data of relevance. In response to receiving UE registration status 240 message, HSS 208 may store the SA registration status 244 (e.g., UE is SA registered).

According to an exemplary scenario, AS 202 may generate and transmit a subscribe request 248 to SCEF 204. According to this example, subscribe request 248 may pertain to event notification when UE 214 changes location. According to another example, the event may be different. Subscribe request 248 may include an identifier of UE 214 and data indicating the event (e.g., change of location or another type of event of interest to AS 202). In response to receiving subscribe request 248, as further illustrated, SCEF 204 may generate and transmit or forward a subscribe request 252 to HSS 208. Subscribe request 252 may also include an identifier of UE 214 and data indicating the event.

In response to receiving subscribe request 252, HSS 208 may determine 255 whether UE 214 is in an SA registration status or not (e.g., an NSA registration status or some other type of non-SA registration status). According to some exemplary embodiments, the determination may be a binary choice. Alternatively, HSS 208 may determine 255 whether UE 214 is in an NSA registration status or not (e.g., an SA registration status or some other type of non-NSA registration status). According to this exemplary scenario, HSS 208 may determine that UE 214 is in an SA registration status and, in response, generate and transmit a subscribe request 258, which relates to UE 214 and the change of location event, to UDM/R 210.

Referring to FIG. 2B, UDM/R 210 may generate information pertaining to the requested subscription, and transmit a response 260, which may indicate that the subscription has been created, to HSS 208. Additionally, UDM/R 210 may generate and transmit a MONTE request 265 to 5G SA core 212. For example, MONTE request 265 may cause various network devices of 5G SA core 212 (and potentially access device 107) to monitor and report when the subscribed event associated with UE 214 occurs. Thereafter, according to an exemplary scenario, UE 214 may change its location, and a UE location change procedure 267 may be performed. Based on the occurrence of this event, 5G SA core 212 may generate and transmit a report 270, which may indicate that UE 214 has changed location, to UDM/R 210 based on the UE location change procedure 267. For example, one or multiple core devices 122 of 5G SA core 212 (and/or access device(s) 107 of access network 105) may monitor for and report when the subscribed event occurs.

As further illustrated, in response to receiving report 270, UDM/R 210 may determine whether HSS 208 is subscribed for this event in relation to UE 214. According to this exemplary scenario, UDM/R 210 may determine that HSS 208 is subscribed and, in response, generate and transmit to HSS 208 a MONTE report 275 pertaining to the location change and UE 214. In response to receiving MONTE report 275, HSS 208 may determine the associated subscription (e.g., AS 202), and perform a 4G MONTE procedure 278 that includes reporting the detected event of UE 214 to AS 202. For example, HSS 208 may generate and transmit a MONTE report, which pertains to a change of location when UE 214 is in SA registration status, to SCEF 204. SCEF 204 may generate and transmit a MONTE report to AS 202.

According to an exemplary scenario, assume thereafter, UE 214 may move again in which UE 214 is no longer in an SA registration status. Based on the HSS 208 subscription, UDM/R 210 may generate and transmit a UE registration status 280 message, which indicates that UE 214 is not in an SA registration status. In response to receiving UE registration status 280 message, HSS 208 may update the UE's registration status 282. For example, according to an exemplary scenario, UE 214 may be attempting to transition to an NSA registration status. As such, HSS 208 may update UE's registration status as being in an NSA registration status. Thereafter, HSS 208 may perform a MONTE procedure 285. For example, HSS 208 may communicate with 4G/5G NSA core 206 to establish the MONTE service. Although not illustrated, when UE 214 changes location when in NSA registration status, the event may be reported to SCEF 204, and subsequently reported to AS 202.

FIGS. 2A and 2B illustrate and describe an exemplary process of an exemplary embodiment of the monitoring event handling service, however according to other exemplary embodiments, the monitoring event handling service may include additional, different and/or fewer operations relative to those described. For example, according to some exemplary embodiments, a requested MONTE event pertaining to NSA may not match that of a MONTE event pertaining to SA. For example, AS 202 may request a PDN connection status for UE 214 as the MONTE event. However, on the 5G or SA side, UE 214 may be monitored for packet data unit (PDU) connection status and/or a QoS flow status. As such, process 200 may include a mapping or translation service. In this way, a difference in an event between when UE 214 is in an NSA registration status compared to when UE 214 is in an SA registration status may be reconciled.

According to various exemplary embodiments, HSS 208 and/or UDM/R 210 may provide the mapping or translation service. For example, HSS 208 may perform the mapping service as a part of step 258 of FIG. 2A. Additionally, or alternatively, for example, UDM/R 210 may perform the mapping service as a part of step 265 of FIG. 2B. The mapping service may be invoked or performed during other appropriate steps and/or by other network devices, as described herein.

Figure 3:
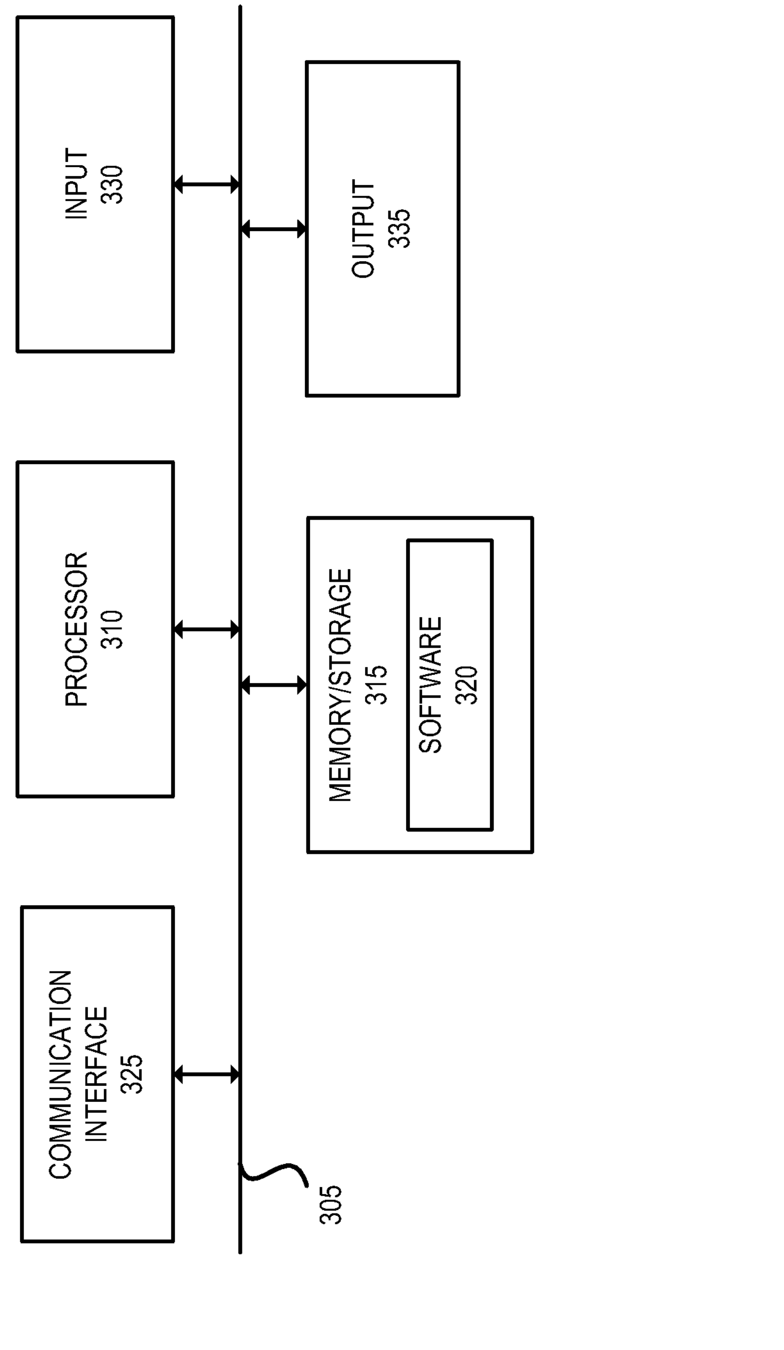
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to access device 107, external device 117, core device 122, end device 130, and/or other types of devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. As an example, with reference to core device 122 (e.g., SCEF 204, HSS 208, UDM/R 210, and/or other types of core devices 122 as described herein), software 320 may include an application that, when executed by processor 310, provides a function and/or a process of monitoring event handling service, as described herein. Additionally, with reference to access device 107, software 320 may include an application that, when executed by processor 310, provides a function and/or a process of monitoring event handling service, as described herein. Software 320 may also include firmware, middleware, microcode, hardware description language (HDL), and/or other form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces and/or wired interfaces. For example, communication interface 325 may include one or multiple transmitters and receivers, or transceivers. Communication interface 325 may operate according to a protocol stack and a communication standard.

Input 330 permits an input into device 300. For example, input 330 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 300 may be implemented in the same manner. For example, device 300 may be instantiated, created, deleted, or some other operational state during its life-cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 performs a function or a process described herein based on the execution of hardware (processor 310, etc.).

Figure 4:
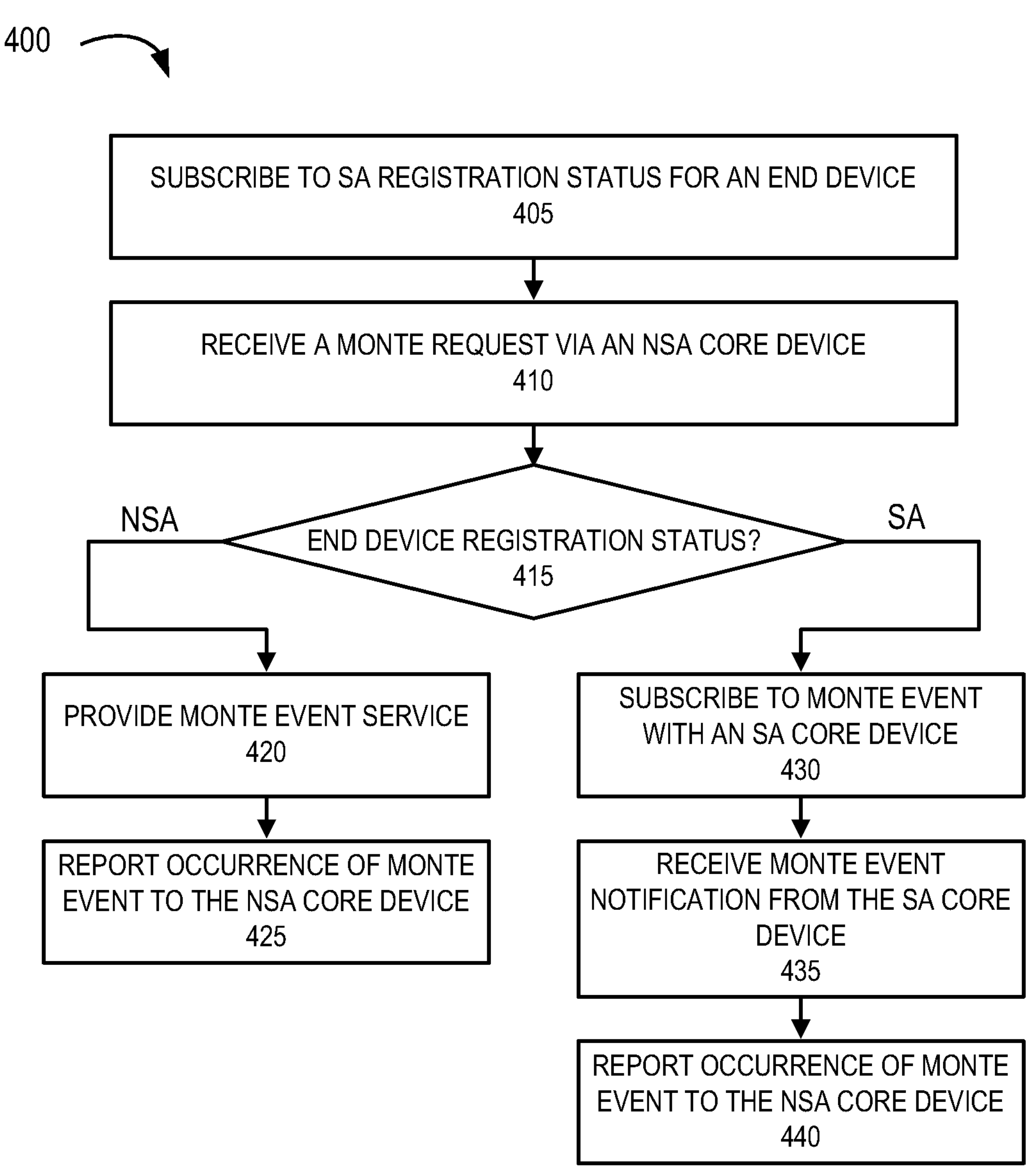
FIG. 4 is a flow diagram illustrating yet another exemplary process of an exemplary embodiment of the monitoring event handling service.

FIG. 4 is a flow diagram illustrating an exemplary process 400 of an exemplary embodiment of the monitoring event handling service. According to an exemplary embodiment, HSS 208 or a similar functioning network device may perform a step of process 400. According to an exemplary implementation, processor 310 executes software 320 to perform the step of process 400, as described herein. Alternatively, the step may be performed by execution of only hardware.

In block 405, an HSS may subscribe to an SA registration status for an end device. For example, the HSS may be part of an NSA core deployment. The HSS may subscribe to the SA registration status of the end device with a UDM/R of an SA core deployment, for example.

In block 410, the HSS may receive a MONTE request via an NSA core device. For example, the HSS may receive the MONTE request from an AS via an SCEF of the NSA core deployment. The MONTE request may pertain to the end device and an event, as described herein.

In block 415, the HSS may determine the registration status of the end device. For example, as a binary choice between an SA registration status or an NSA registration status, the HSS may determine whether the end device is SA registered or NSA registered. The HSS may make this determination in response to receiving the MONTE request.

When it is determined that the end device is NSA registered (block 415—NSA), the HSS may provide the MONTE service (block 420). For example, the HSS may perform an NSA MONTE procedure with NSA core devices to setup or establish the requested MONTE service. In block 425, when the event occurs, the HSS may report the occurrence of the event to the NSA core device. For example, the HSS may report the event to the AS via the SCEF.

When it is determined that the end device is SA registered (block 415-SA), the HSS may subscribe to the MONTE event with an SA core device (block 430). For example, the HSS may subscribe to the MONTE event with the UDM/R of the SA core deployment.

In block 435, when the event occurs, the HSS may receive a notification from the SA core device. For example, the event may occur when the end device is SA registered, and the HSS may receive the notification pertaining to the MONTE event from the UDM/R.

In block 440, the HSS may report the occurrence of the event to the NSA core device. For example, the HSS may notify the SCEF and/or the AS of the occurrence of the MONTE event.

FIG. 4 illustrates an exemplary embodiment of a process of the monitoring event handling service, according to other exemplary embodiments, the monitoring event handling service may perform additional operations, fewer operations, and/or different operations than those illustrated and described. For example, as previously described, the HSS may perform a mapping service between the NSA and the SA MONTE events. For example, the HSS may convert the requested NSA MONTE event from the AS to an SA MONTE event in block 430. The HSS may convert the SA MONTE event to the requested NSA MONTE event in block 440. According to an exemplary embodiment, the HSS may generate SA MONTE event data based on the NSA MONTE event data or vice versa. According to another exemplary embodiment, the HSS may perform a lookup that correlates NSA MONTE events to SA MONTE events.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described regarding the processes illustrated in FIG. 4, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:

subscribing, by a first network device of a non-stand-alone core network with a second network device of a stand-alone core network responsive to a non-stand-alone registration procedure between an end device and the first network device, for when the end device is in a stand-alone registered status in the stand-alone core network, wherein the first network device is a home subscriber server and the second network device includes a unified data management device;

receiving, by the first network device after the subscribing via the non-stand-alone core network, a monitoring event request pertaining to the end device;

subscribing, by the first network device with the second network device, to a monitoring event service for the monitoring event request;

receiving, by the first network device from the second network device, a message indicating an occurrence of an event pertaining to the monitoring event request; and transmitting, by the first network device via the non-stand-alone core network, a notification message.

2. The method of claim 1, further comprising:

determining, by the first network device, in response to the receiving of the monitoring event request, that the end device is stand-alone registered with the stand-alone core network.

3. The method of claim 1, further comprising:

receiving, by the first network device from the second network device after the subscribing to when the end device is in the stand-alone registered status, an indication that the end device is stand-alone registered with the stand-alone core network.

4. The method of claim 1, wherein the subscribing to the monitoring event service comprises:

converting, by the first network device, a non-stand-alone event of the monitoring event request to the event, which is a stand-alone event and differs from the non-stand-alone event; and transmitting, by the first network device to the second network device, a request that indicates the event.

5. The method of claim 1, wherein the monitoring event request is received from a service capability exposure function device of the non-stand-alone core network.

6. The method of claim 1, wherein the subscribing to the monitoring event service comprises:

transmitting, by the first network device to the second network device, a request that indicates a first event of the monitoring event request, wherein the first event and the event are the same.

7. The method of claim 1, further comprising:

determining, by the first network device in response to the receiving of the monitoring event request, whether the end device is stand-alone registered or not, wherein the determining is a binary choice.

8. The method of claim 1, wherein the first network device transmits the notification message to an application server of an external network.

9. A network device comprising:

a processor configured to:

subscribe, with an other network device of a stand-alone core network responsive to a non-stand-alone registration procedure between an end device and the network device, for when the end device is in a stand-alone registered status in the stand-alone core network, wherein the network device is a home subscriber server of a non-stand-alone core network and the other network device includes a unified data management device;

receive, after the subscribing via the non-stand-alone core network, a monitoring event request pertaining to the end device;

subscribe, with the other network device, to a monitoring event service for the monitoring event request;

receive, from the other network device, a message indicating an occurrence of an event pertaining to the monitoring event request; and transmit, via the non-stand-alone core network, a notification message.

10. The network device of claim 9, wherein the processor is further configured to:

determine, in response to the receiving of the monitoring event request, that the end device is stand-alone registered with the stand-alone core network.

11. The network device of claim 9, wherein the processor is further configured to:

receive, from the other network device after the subscribing to when the end device is in the stand-alone registered status, an indication that the end device is stand-alone registered with the stand-alone core network.

12. The network device of claim 9, wherein the processor is further configured to:

convert, a non-stand-alone event of the monitoring event request to the event, which is a standalone event and differs from the non-stand-alone event; and transmit, to the other network device, a request that indicates the event.

13. The network device of claim 9, wherein the monitoring event request is received from a service capability exposure function device of the non-stand-alone core network.

14. The network device of claim 9, wherein the processor is further configured to:

transmit, to the other network device, a request that indicates a first event of the monitoring event request, wherein the first event and the event are the same.

15. The network device of claim 9, wherein the network device transmits the notification message to an application server of an external network.

16. The network device of claim 9, wherein the processor is configured to:

determine, in response to the receiving of the monitoring event request, whether the end device is stand-alone registered or not, wherein the determining is a binary choice.

17. A non-transitory computer-readable storage medium storing instructions executable by a processor of a home subscriber server of a non-stand-alone core network, wherein the instructions are configured to:

subscribe, with an other network device of a stand-alone core network responsive to a non-stand-alone registration procedure between an end device and the home subscriber server, for when the end device is in a stand-alone registered status in the stand-alone core network, wherein the other network device is unified data management device;

receive, after the subscribing via the non-stand-alone core network, a monitoring event request pertaining to the end device;

subscribe, with the other network device, to a monitoring event service for the monitoring event request;

receive, from the other network device, a message indicating an occurrence of an event pertaining to the monitoring event request; and transmit, via the non-stand-alone core network, a notification message.

18. The non-transitory computer-readable storage medium of claim 17, wherein the instructions are further configured to:

determine, in response to the receiving of the monitoring event request, that the end device is stand-alone registered with the stand-alone core network.

19. The non-transitory computer-readable storage medium of claim 17, wherein the instructions are further configured to:

transmit, to the other network device, a request that indicates a first event of the monitoring event request, wherein the first event and the event are the same.

20. The non-transitory computer-readable storage medium of claim 17, wherein the instructions are further configured to:

convert, a non-stand-alone event of the monitoring event request to the event, which is a standalone event and differs from the non-stand-alone event; and transmit, to the other network device, a request that indicates the event.

* * * * *